United States Patent
Miwa et al.

(10) Patent No.: US 6,317,186 B1
(45) Date of Patent: Nov. 13, 2001

(54) METHOD FOR SEALING CORNER REGIONS OF A LIQUID CRYSTAL DISPLAY

(75) Inventors: Koichi Miwa, Yokohama; Michikazu Noguchi, Sagamihara; Shunji Suzuki, Yokohama, all of (JP); Ho Chong Lee, Endicott, NY (US); Donald Philip Seraphim; Dean William Skinner, both of Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/221,096

(22) Filed: Dec. 28, 1998

(51) Int. Cl.$^7$ .................................................. G02F 1/1339
(52) U.S. Cl. ........................................ 349/153; 349/190
(58) Field of Search ...................... 349/153, 154, 349/158, 190, 192

(56) References Cited

U.S. PATENT DOCUMENTS

| | | | |
|---|---|---|---|
| 5,742,006 | * 4/1998 | Grupp et al. | 174/52.2 |
| 5,828,435 | * 10/1998 | Kato et al. | 349/190 |
| 5,867,236 | * 2/1999 | Babuka et al. | 349/73 |
| 5,929,959 | * 7/1999 | Iida et al. | 349/154 |
| 6,013,339 | * 6/2000 | Yamada et al. | 428/1 |
| 6,057,898 | * 5/2000 | Itoh et al. | 349/73 |
| 6,124,917 | * 9/2000 | Fujioka et al. | 349/153 |

* cited by examiner

*Primary Examiner*—Kenneth Parker
*Assistant Examiner*—Mike Qi
(74) *Attorney, Agent, or Firm*—Scully, Scott, Murphy & Presser; Marian Underweiser, Esq.

(57) ABSTRACT

A method for applying the sealing material onto the corner regions of the substrate to realize the liquid crystal cell with large display region. A protrude region 100 is formed on each of the side regions adjacent to a display region of a first substrate 20. A difference of level is formed at each boundary of the side region and the corner region on one surface of the first substrate 20 for providing the corner region with a height which is lower than a height of the side region. A sealing material 30 is applied on the side regions and the corner regions on the one surface of the first substrate 20 by a tool for dispensing the sealing material 30. When a second substrate 10 is positioned on the applied sealing material 30 on one surface of the first substrate 20, a distance between the first substrate 20 and the second substrate 10 is decreased and the sealing material 30 applied on the first substrate 20 is collapsed.

16 Claims, 6 Drawing Sheets

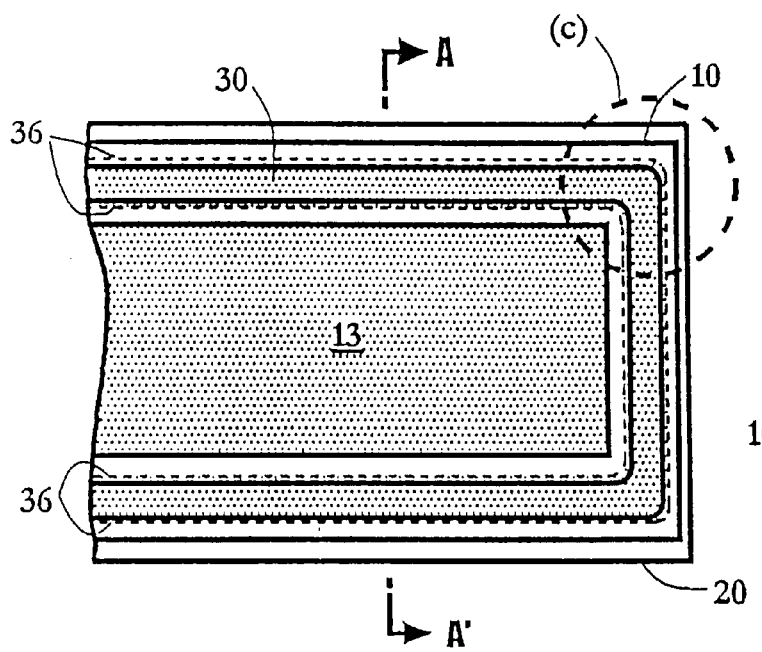
FIG. 1 (a)
(PRIOR ART)
FIG. 1(b)
(PRIOR ART)
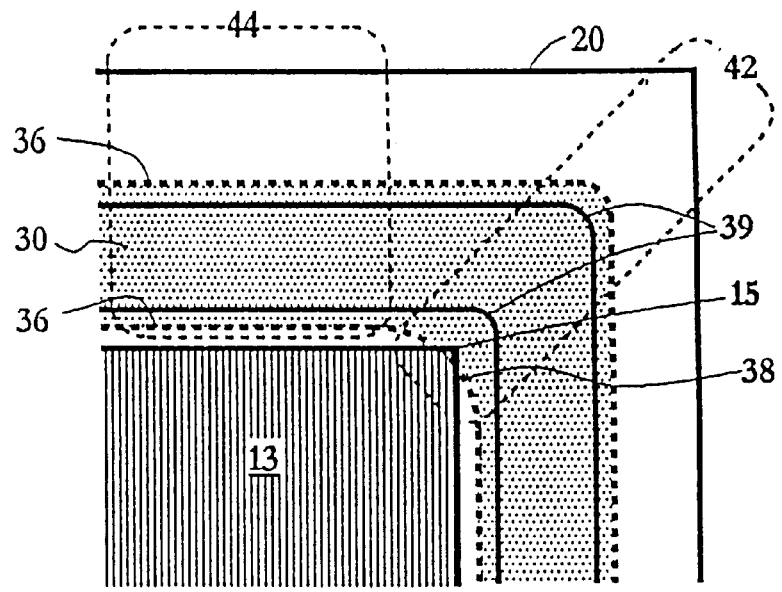
FIG. 1(c)
(PRIOR ART)

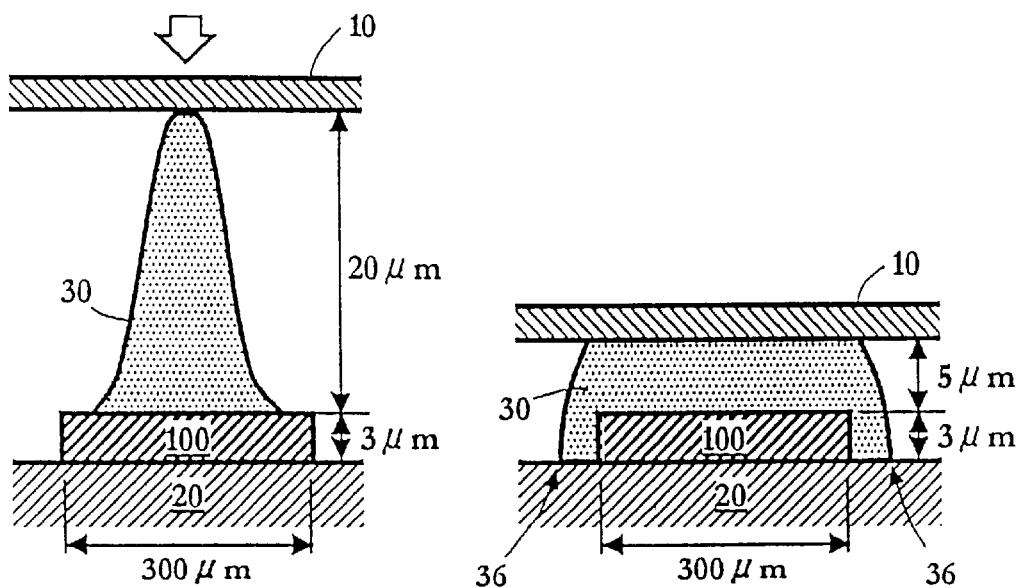
FIG. 3(a) CROSS SECTION ALONG B-B'
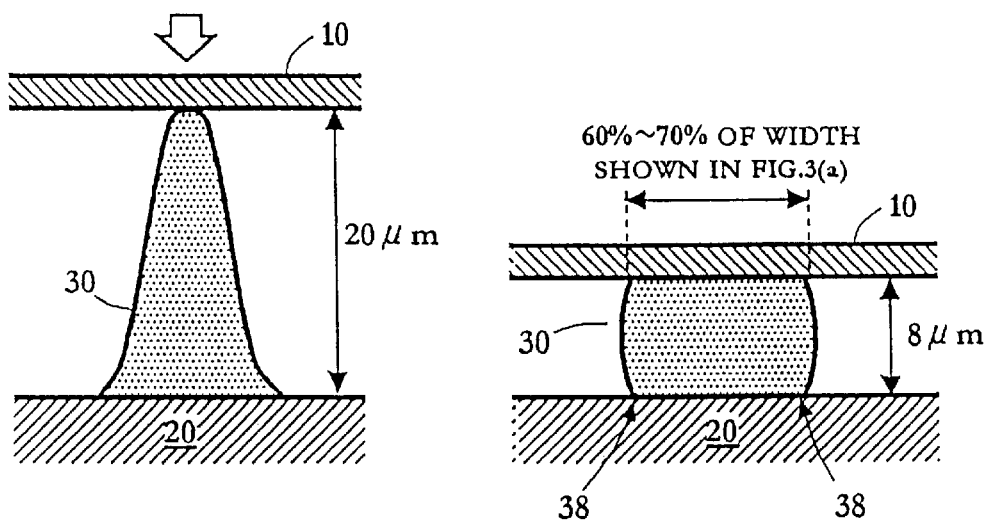
FIG. 3(b) CROSS SECTION ALONG C-C'

METHOD FOR SEALING CORNER REGIONS OF A LIQUID CRYSTAL DISPLAY

BACKGROUND OF THE INVENTION

1. Field of the Invention

The present invention relates to a method for fabricating a liquid crystal display device whereby sealing material is applied to peripheral portions of two substrates of the liquid crystal display device.

2. Related Art

The liquid crystal cell is used as a display panel of a wristwatch, a desk top calculator, etc. A recent field of a use of the liquid crystal cell has been broadened to a mobile apparatus (an information terminal device) or a large size display device.

FIGS. 1(a)–(c) show a structure of a prior art liquid crystal cell formed by sealing the peripheral portions of two substrates face to each other by the sealing material, such as epoxy resin. FIG. 1(a) shows a plan view of the structure of one substrate of the liquid crystal cell. FIG. 1(b) shows a cross section along a cutting line A–A'. Particularly, in the FIG. 1(a), a pixel region 13, i.e. the display region, within the liquid crystal cell and the sealing scheme of the sealing material 30 are shown.

A first substrate 20 is made of a flat and hard glass plate. A major part of an upper surface of the first substrate 20 is the pixel region, i.e. the display region 13 on which colored layers forming R, G and B color filters (CF) are formed. The sealing material 30 is applied in a peripheral portion extending along the outer edge of the display region 13 of the first glass substrate 20 except a small portion which is later used as an entrance for the liquid crystal material. Small size spacers 40 are scattered on an entire area of the display region 13 to keep a thickness of a liquid crystal material to a constant value. A second substrate 10 is made of the flat and hard glass plate. A plurality of pixels, each of which includes a thin film transistor (TFT), are formed on the surface of the second substrate 10 to face each pixel on the first substrate 20. The second substrate 10 and the first substrate 20 are faced to each other, and the applied sealing material 30 is deformed to bond the two substrates 10 and 20. The sealing material 30, such as the epoxy resin, is cured by heating the bonded substrates and the liquid crystal cell is sealed. The liquid crystal material is put into the liquid crystal cell through the entrance by a method well known in the art, and the final product of the liquid crystal cell is completed.

The FIG. 1(c) schematically shows the deformed sealing material 30 on the corner region 42 during the sealing process in the prior art liquid crystal cell. Initially, the sealing material 30 on the corner region 42 is applied, as shown by hard lines 39. In the process for positioning the second substrate 10 on the sealing material 30, the sealing material on both the regions adjacent to the corner region 39 is moved and pressed toward the corner of the display region 13 resulting the pressed sealing material with an arc like edge 38 shown by a dash line.

The pixel region 13 in a side region 44 is generally formed to come near to an edge 36 of the sealing material 30 to insure the large display region 13. If the arc like edge 38 of the sealing material 30 in the corner region, however, extends toward the inside of the substrate 20, it covers the corner 15 of the pixel region 13. If the corner 15 of the pixel region 13 is covered by the sealing material 30, a defect of the displayed image is generated in the corner 15. To keep a good display quality in a corner region 42, it is necessary to keep away the corner 15 of the display region 13 from the inside edge 38 of the sealing material 30. In this case, however, it is required to broaden the space between the horizontal edge of the pixel region 13 and the inside edge 36 of the sealing material 30 to realize the large pixel region 13, resulting in that a use of a large substrate 20 is required.

Japanese Published Unexamined Patent Application 4-20929 discloses a liquid crystal cell in which an uneven portion is formed along peripheral portion of each of two substrates, a sealing material is applied on the uneven portion, and the two substrates are faced to each other and sealed. By providing the uneven portion on the portions on which the sealing material is applied, a strong adhesive strength is obtained, a penetration of water component into the liquid crystal cell is suppressed, and a reliability of a display panel is guaranteed.

Japanese Published Unexamined Patent Application 52-45947 discloses a technology for forming a groove along a peripheral edge of one of glass substrates of a liquid crystal cell. In a process for sealing the two glass substrates, an excess sealing material flows into the groove, so that a straight edge of the sealing material facing to a display area without an undesired wave like shape is realized. Since the edge of the sealing material facing to the display area is a straight line, a product value of the liquid crystal display panel is increased.

These prior art references, however, do not teach an improved method for applying the sealing material onto the corner regions of the substrate.

With the recent development of the mobile devices, such as a notebook computer, a personal data assistant (PDA), a handy phone, the requirement of the liquid crystal panel with the narrow frame region has been increased. To satisfy the technical requirement of the liquid crystal cell with the narrow frame region, it has been required to apply the sealing material used for sealing the two substrates onto the corner regions without partially overlapping with the corners 15 of the display region 13.

These prior art references discussed above do not teach a technology of the fabrication of the liquid crystal cell for narrowing the frame region surrounding the corner region of the display region.

SUMMARY OF THE INVENTION

An object of the invention is to provide a method for applying the sealing material onto the corner regions of the substrate to realize the liquid crystal cell with the large display region.

According to the present invention, a liquid crystal cell is fabricated by sealing two substrates whereby a sealing material is placed on side regions and corner regions surrounding a display region. The sealing operation comprises the steps of: forming a difference of level at each boundary of the side region and the corner region on one surface of a first substrate for providing the corner region with a height which is lower than a height of the side region; applying the sealing material on the side regions and the corner regions on the one surface of the first substrate; and positioning a second substrate on the sealing material on the one surface of the first substrate, and decreasing a distance between the first substrate and the second substrate to collapse the sealing material applied on the side regions and the corner regions to thereby seal the first and second substrates.

In an alternate embodiment, the two substrates sealed by a sealing material placed on regions adjacent to edges of the substrates, and the sealing operation comprises the steps of: applying a sealing material on side regions and corner regions surrounding a display region on one surface of a first substrate; positioning a second substrate on the sealing material on the one surface of the first substrate, and decreasing a distance between the first substrate and the second substrate to collapse the sealing material applied on the side regions and the corner regions to seal the first and second substrates, wherein the step of applying the sealing material applies U shaped sealing material in the corner region, which extends toward a corner of the substrate, whereby an inside edge of the collapsed sealing material of one leg portion of the U shaped sealing material and an inside edge of the other leg portion of the U shaped sealing material form the substantially right angled corner during the step of collapsing the sealing material.

BRIEF DESCRIPTION OF THE DRAWINGS

FIGS. 1(a)–(c) show a structure of a prior art liquid crystal cell formed by sealing the peripheral portions of two glass substrates to each other by the sealing material.

FIGS. 3(a) and (b) show the cross sections of the sealing material 30 on the side regions and the corner regions for sealing the liquid crystal cell shown in the FIG. 2.

DETAILED DESCRIPTION OF THE INVENTION

Figure 2:
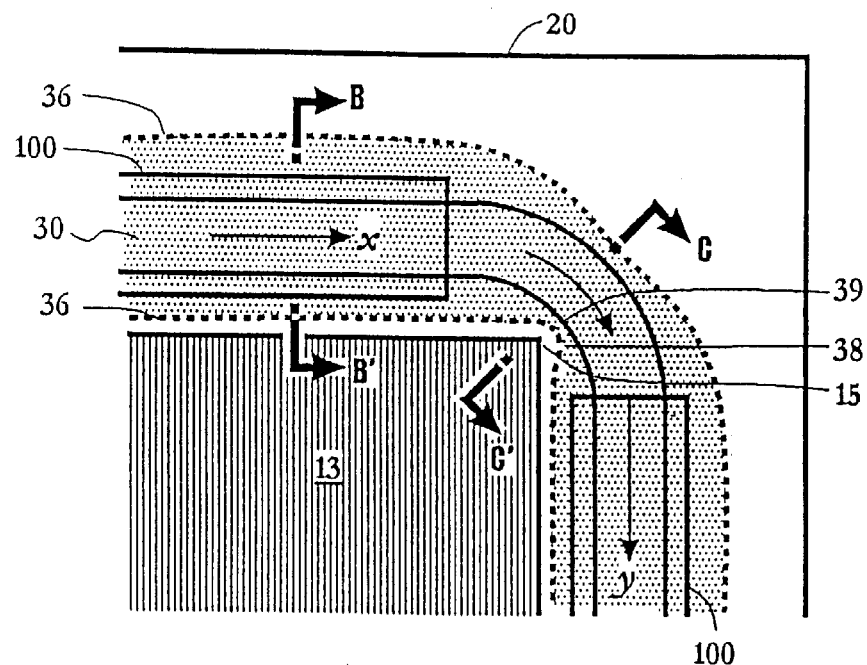
FIG. 2 shows one embodiment of the present invention of the method for forming the protrude portion on the side regions of the substrate and applying a sealing material.
Figure 4:
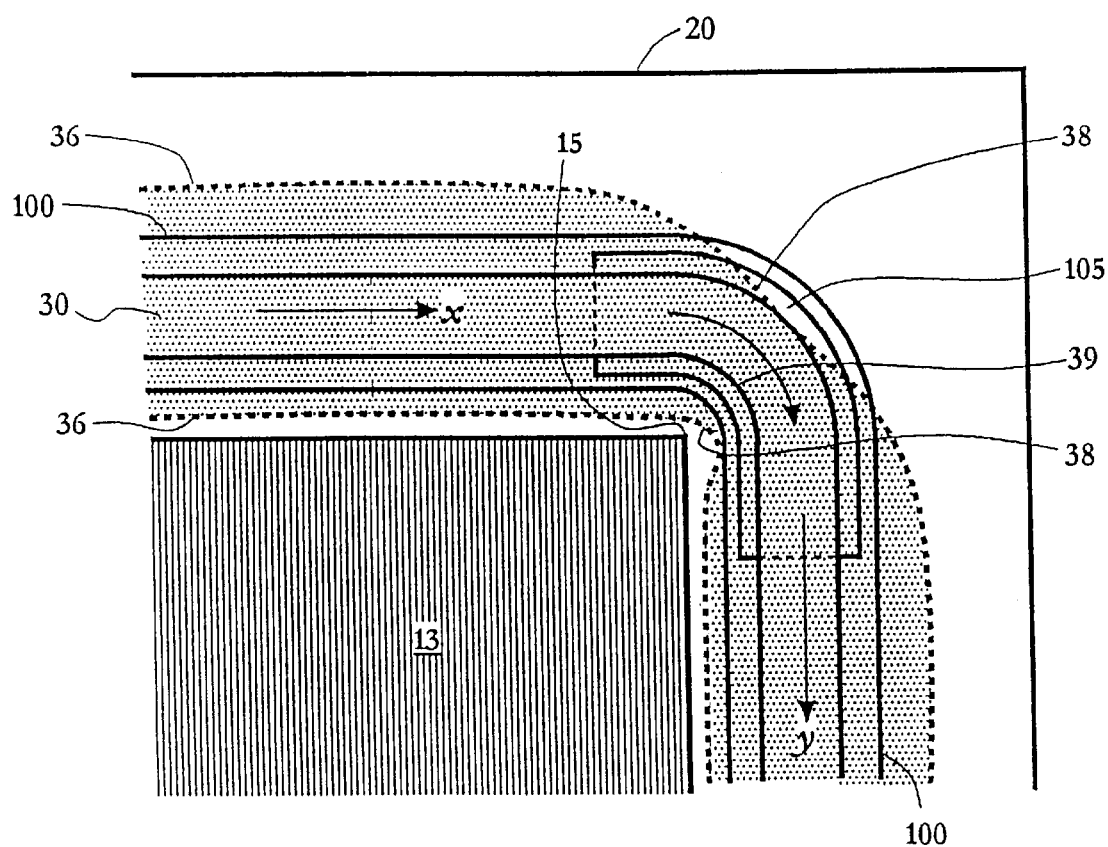
FIG. 4 shows one aspect of the method of the present invention for forming the recess region 105 on the corner regions of the substrate 20 and applying the sealing material.

FIG. 2 shows one embodiment of the method of the present invention for applying a sealing material 30 on the side regions and the corner regions of a first substrate 20 surrounding a display region 13. A protrude portion or a pedestal 100 is formed on each of the side regions extending along the peripheral edge of the substrate 20. A difference of level is formed at each boundary of the side regions and the corner region surrounding the display region 13 causes a height of an upper surface of the corner region to be lower than a height of an upper surface of the side region The concept of the present invention is to adjust an amount of collapse of the sealing material 30 on the corner region of the substrate 20 and to reduce a space between the edge of the display region 13 and the edges 36 and 38 of the collapsed sealing material 30 as small as possible. Accordingly, the present invention is not limited to the structure in which the protrude portions 100 are formed on the sides along the peripheral edges of the substrate 20. Any structure satisfying the condition that the height of the upper surface of the corner region is lower than the height of the protrude portion 100 can be used. For example, a structure in which a groove portion, such as a recess region, is formed in the corner region of the substrate 20, as shown in FIG. 4, can be used.

The first substrate 20 is a CF (color filter) substrate having the pixel region 13, i.e. the display region, including a color filter layer formed, and the second substrate 10 is a TFT (thin film transistor) layer having the thin film transistors formed. FIG. 2 shows the structure of the seal on a portion of the protrude portions 100 and the corner region on the upper surface of the CF substrate 20.

Solid lines of the sealing material 30 shown in the FIG. 2 show the edges of the sealing material which is uniformly applied on the side regions and the corner regions along the peripheral edge of the substrate 20. A tool for applying the sealing material is moved in a X direction along the upper surface of the protrude portion 100 on the upper side region, is smoothly moved along an arc like trace in the corner region and is moved in a Y direction along the upper surface of the protrude portion 100 on the right side region to apply the sealing material with an uniform amount. Such applying method realizes the seal with an uniform quality on the corner regions of the liquid crystal cell.

FIG. 3 shows a shape of a cross section of the sealing material 30 applied on the upper surfaces of protrude portions 100 on the side regions and the upper surfaces of the corner regions of the substrate 20. The sealing process is made to apply the sealing material 30 of a bulk shape of a height of about 20 μm on both the protrude portions 100 and corner portions of the substrate 20. When the second substrate 10 is positioned to face the first substrate 20 and moved toward the first substrate 20, as shown by an arrow shown in the FIG. 3(a), the sealing material 30 is collapsed or pressed to seal the two substrates 10 and 20.

FIGS. 3(a) and (b) show the cross sections along cutting lines B–B' and C–C' in the FIG. 2. It is assumed that the protrude portion 100 has a width of 300 μm and a height of 3 μm. The two substrates 10 and 20 are sealed with a space of about 8 μm defined by the spacers 40 (FIG. 1(b)) on the display region 13. The FIG. 3(b) shows that the distance between both the edges 38 of collapsed sealing material 30 on the corner region is smaller than the distance between both the edges 36 of the collapsed sealing material 30 on the side region shown in the FIG. 3(a), and the distance between both the edges 38 shown in the FIG. 3(b) is about 60–70% of the distance between both the edges 36 shown in the FIG. 3 (a). It is particularly noted that the distance of the movement of the inside edge 38 of the collapsed sealing material 30 toward the display region 13 is remarkably decreased, as shown by the dashed lines 36–38 in the FIG. 2, in comparison with that of the prior structure shown in the FIG. 1(c).

The total height on the side region of the substrate 20 is represented by a sum of the height (20 μm) of the applied sealing material 30 and the height (3 μm) of the protrude portion 100, while the total height on the corner region of the substrate 20 is represented by only the height (20 μm) of the applied sealing material 30. During that the second substrate 10 is pressed toward the substrate 20 to form the space of 8 μm between the substrates 10 and 20, the amount of collapsed or pressed sealing material 30 on the corner region is smaller than the amount of collapsed sealing material 30 on the protrude portion 100 since the protrude portion 100 is not formed on the corner region. In this embodiment, an amount of spread of the edges 38 of the sealing material 30 on the corner region of the substrate 20 is limited, while an amount of spread of the edges 36 of the sealing material 30 on the side region of the substrate 20 is large due the existence of the volume of the protrude portion 100 below the sealing material 30. In the present invention, it is possible to cause the angle formed by the dotted line 36 and the dotted line 38 to be substantially right angle, as shown in the FIG. 2, rather than the circular shape, as shown in the FIG. 1(c), by using the difference between the amount of spread of the edges 38 of the sealing material 30 on the corner region and the amount of spread of the edges 36 of the sealing material 30 on the side region of the substrate 20.

An alternate pattern of the protrude portions 100 can be used to form a predetermined shape of the pressed or collapsed edges 38 of sealing material 30. For example, a pattern can be used in which the height of the protrude portion 100 on the side regions of the substrate 20 is gradually decreased toward the corner region to form a stepwise shape.

The protrude portions 100 can be formed by using the process for forming the pixel region 13 on the substrate 20. The structure of the pixel region 13 includes the colored layers for forming the color filter of the three primary colors (Red, Green and Blue) and a transparent ITO (Indium Tin Oxide) electrode for covering the upper surface of the colored layers.

During the deposition of the colored layers and the ITO layer on the pixel region 13 of the substrate 20, the colored layer of any color is deposited on the side region to form the protrude portion 100. More particularly, the pattern of the protrude portion 100 on the side region of the substrate 20 is formed by patterning the deposited colored layer. Then, the ITO layer is deposited on the entire surface of the substrate 20. In this example, the ITO layer is also deposited on the surface of the corner region on which the colored layer is not formed.

FIG. 4 shows another aspect of the method of the present invention for forming groove portions, such as recess regions 105 on the corner regions of the substrate 20 and applying the sealing material. In the aspect shown in the FIG. 4, the colored layer is deposited on both the side regions and corner regions during the process for depositing the colored layers on the pixel region 13. The protrude portions 100 and the groove portions 105 are formed by selectively etching the colored layer on the side regions and the corner regions. Then, the ITO layer is deposited in the entire surface of the substrate 20, as in the former case. The depth, the width and the shape of the groove portion 105 are designed to provide a capacity which is less than the volume of the deposited sealing material 30 and to provide the shape of the sealing material 30, as shown in the left side views in the FIG. 3(b). The groove portion 105 decreases the movement of the edge 38 of the sealing material 30 over the groove portion 105 toward the display region 13, so that the meritorious effect that the corner portions of the liquid crystal cell can be sealed by the sealing material with the designed width on the designed position can be realized. More particularly, the substantially right angled edge 38 of the sealing material 30, in viewing the plan view of the FIG. 4, can be realized on the corner regions of the liquid crystal cell.

It is not necessary to align the height of the colored layer used for the patterns of the protrude portions 100 and the groove portions 105 on the peripheral portion of the substrate 20 with the height of the colored layer on the pixel region 13. For example, the height of the sealing material 30, which is twice or three times as high as the colored layer on the pixel region 13, can be obtained by stacking the colored layers on the peripheral portion for each deposition of the colored layer R of (Red), G (Green) and B (Blue).

The sealing material 30 with a constant width seals the peripheral portion of the liquid crystal cell. To this end, the sealing material with a desired wettability to the upper surface of the peripheral portion of the substrate is selected. In the embodiments of the present invention, the upper surface of the side regions and the corner regions, to which the sealing material 30 is applied, is the ITO layer. Accordingly, the side regions and the corner regions of the substrate 20 indicate the same wettability to the sealing material 30, and hence the sealing material 30 is applied to these regions under the same condition.

The sealing material 30 indicates a predetermined flowability at the application to these regions. At an intermediate heating process for providing the shape of the sealing material 30, as shown in the left side figures of the FIGS. 3(a) and (b), a viscosity of the applied sealing material is lowered a little. The flowability of the sealing material increases due to the decreased viscosity, and hence the sealing material is uniformly applied to the side regions and the corner regions of the substrate 10. Next, the substrates 10 is bought close to the substrate 20, and the sealing material is cured by a heating process, whereby the liquid crystal cell is sealed. In the embodiment of the present invention, epoxy resin is used as the sealing material, and the sealing process includes the intermediate heating process at the temperature of 70–90° C. and the curing process at the temperature of 120–200° C. Another thermosetting adhesive, which can be cured in the above condition, can be used in the present invention.

Figure 5:
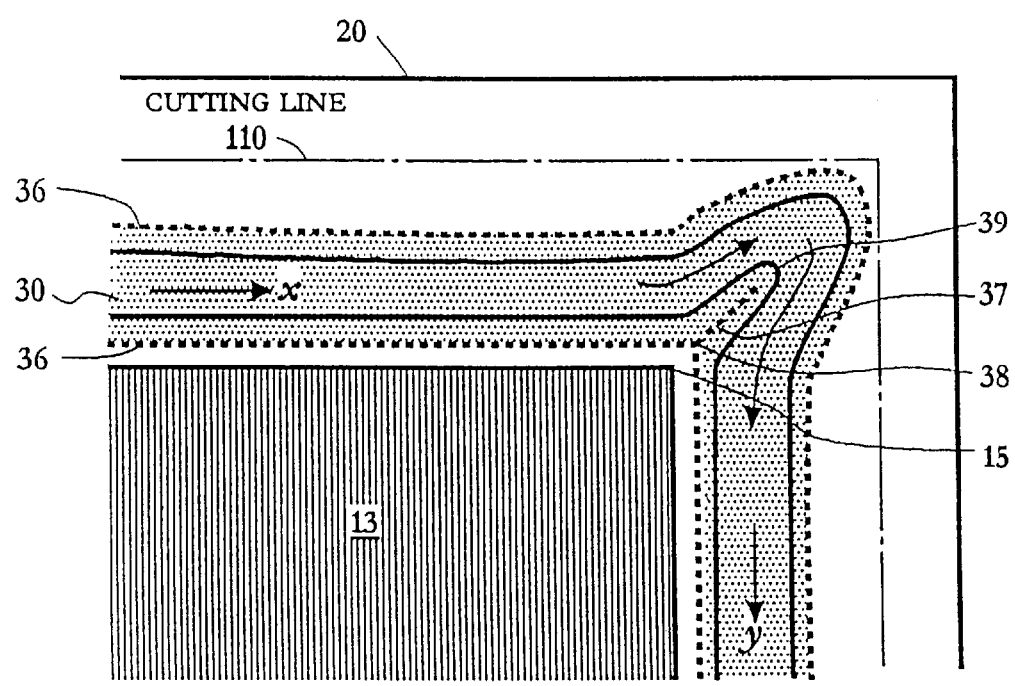
FIG. 5 shows another aspect of the present invention for applying the sealing material 30 to cause the inside edge 38 of the sealing material 30 on the corner region of the liquid crystal cell to be bent at substantially right angle.

FIG. 5 shows another aspect of the present invention for controlling the movement of the tool for dispensing the sealing material to cause the inside edge 38 of the sealing material 30 on the corner region of the liquid crystal cell to be bent at substantially right angle. The hard lines of the sealing material 30 shown in the FIG. 5 shows the shape of the applied sealing material 30 on the substrate 20 by the dispensing tool. The remarkable effect performed by this embodiment is that the shape of the applied sealing material 30 indicated by the hard lines causes the inside edge 38 of the pressed or collapsed sealing material 30 to form a substantially right angle.

In this embodiment, the movement of the tool for dispensing the sealing material 30 is complicatedly controlled to apply the U shaped sealing material 30 on the corner region of the substrate 20. In place of such tool complicatedly moved, another applying method, such as a screen printing method, can be used to apply the U shaped sealing material 30.

In the case that the tool for dispensing the sealing material is used to apply the sealing material 30 on the upper right corner region of the substrate 20, as shown in the FIG. 5, the tool is initially moved in the X direction along the side region adjacent to the upper edge of the substrate 20, then moved toward the corner of the substrate 20 when the tool reaches the corner region, then turned toward the side region adjacent to the right edge of the substrate 20, and then moved in the Y direction along this side region. By such movement of the tool, the U shaped sealing material 30, which has a space between the inside walls of two leg portions faced each other and extends toward the upper right corner of the substrate 20, is applied on the corner region. In this embodiment, although the tool is continuously moved from the side region adjacent to the upper edge of the substrate 20 to the side region adjacent to the right edge of the substrate 20 through the corner region, the application of the sealing material onto these regions can be made by independently moving the tool for each region.

The second substrate 10 is positioned to face the first substrate 20, and is moved toward the first substrate 20, so that the U shaped sealing material 30 indicated by the solid lines in the FIG. 5 is collapsed or pressed to the shape indicated by the dashed lines (edges) 36, wherein the separated inside walls of the two leg portions of the applied sealing material 30 indicated by the solid lines are moved to fill up the space, and finally contact each other as shown by a contact line 37, so that the inside edge 36 of the collapsed or pressed sealing material 30 along the X or horizontal direction and the inside edge 36 of the pressed sealing material along the Y or vertical direction form the substantially right angled corner, whereby the liquid crystal cell surrounded by the narrow frame can be realized. In this manner, the present invention can realize the meritorious effect that the liquid crystal cell with the narrow frame and the excellent display quality at the corner regions is provided.

Figure 6:
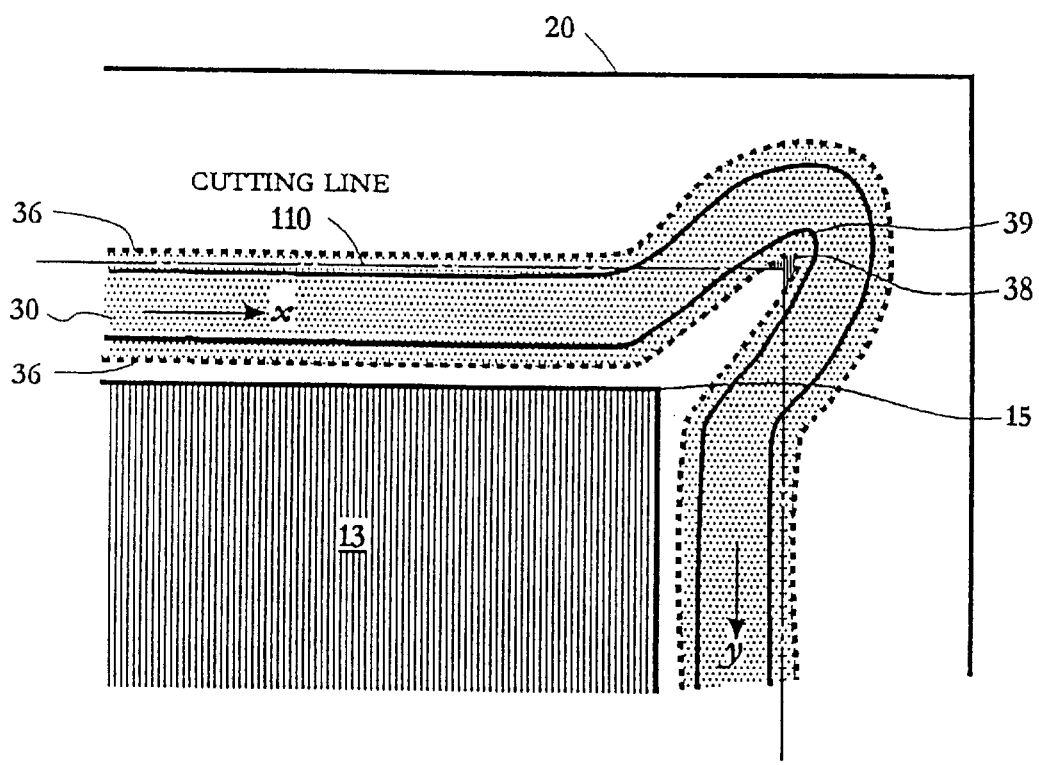
FIG. 6 shows an undesired problem in which the edges 36 and 38 of the collapsed sealing material 30 can not fill up the space.

The U shaped sealing material 30 applied on the corner region, however, might cause a problem in the case that the space between the inside walls of two leg portions faced each other is relatively large. FIG. 6 shows such problem. More particularly, even if the U shaped sealing material 30 is applied on the corner region by the dispensing tool and is pressed or collapsed, the collapsed sealing material 30 can not fill up the space in the case of that the space indicated by the solid lines is relatively large. When the sealed two glass substrates 10 and 20 including the non-filled up space are cut along a cutting line 110, the seal is broken at the portion 38 of the corner. Such broken seal causes a failure of the liquid crystal cell. To prevent the seal from broken at the corner of the substrates, it is necessary to apply the U shaped sealing material 30 with the space which is filled up when the sealing material is collapsed or pressed.

FIG. 7(a) shows a structure in accordance with the present invention for solving the above problem. In this structure, a protrude portion 120 of a rectangular shaped plane is provided on the corner region of the substrate 20 for increasing an amount of collapsed or pressed sealing material 30 on the corner region to increase an amount of movement of the inside edges of the two leg portions. A center line of the protrude portion 120 formed on the corner region is aligned with a diagonal line of the liquid crystal cell. An amount of collapsed or pressed sealing material 30 deposited on the upper surface of the protrude portion 120 on the corner region is larger than an amount of collapsed or pressed sealing material 30 deposited on the space shown in the FIG. 6. Since an amount of collapsed or pressed sealing material 30 is increased, an amount of movement of the edges 38 of the two legs of the pressed sealing material is increased, so that the edges 38 finally contact each other at a contact line 37 to fill up the space.

FIG. 7(b) shows an alternate embodiment of a structure in accordance with the present invention for solving the above problem, i.e. the broken seal. In this structure, an additional sealing material, such as a dot shaped sealing material 130, is applied in a predetermined position within the space before the application or deposition of the U shaped sealing material 30. Since the dot shaped sealing material 130 exists in the space, an amount of movement of edges of the pressed U shaped sealing material 30 on the dot shaped sealing material 130 is increased, and the moved edges 38 of the inside edges of the two leg portions are connected each other through the dot shaped sealing material 130, so that they fill up the space near to the corner 39, whereby the edges 38 finally contact each other at the contact line 37. When the two substrates 10 and 20 sealed each other in this manner are cut along the cutting line 110, the liquid crystal cell without the broken portion 38 at the corner, as shown in the FIG. 6, can be obtained. As alternative step, the dot shaped sealing material 130 is initially applied, then the U shaped sealing material 30 can be applied to surround the dot shaped sealing material 130.

Figure 7:
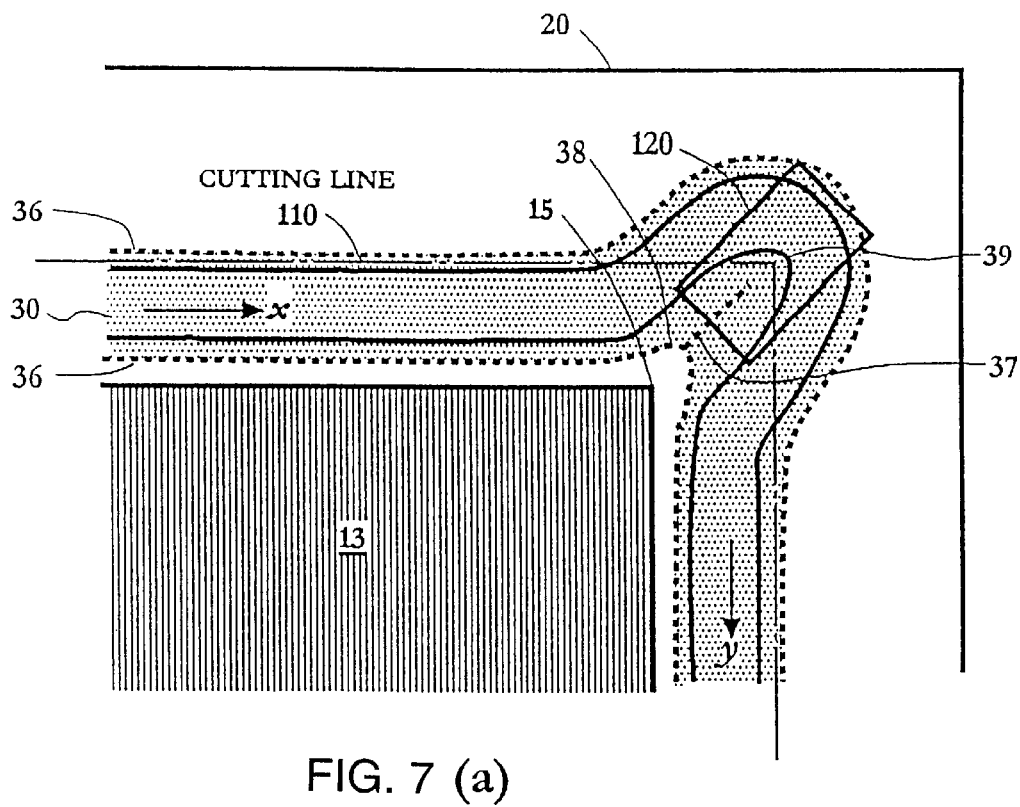
FIG. 7(a) shows a structure in accordance with the present invention for solving the above problem, in which a protrude portion 120 of a rectangular shaped plane is provided on the corner region of the substrate 20 for increasing an amount of collapsed or pressed sealing material 30 on the corner region to fill up the space.
FIG. 7(b) shows an alternate structure in accordance with the present invention for solving the above problem, in which an additional sealing material, such as a dot shaped sealing material 130, is applied in a predetermined position within the space to fill up the space.
Figure 7:
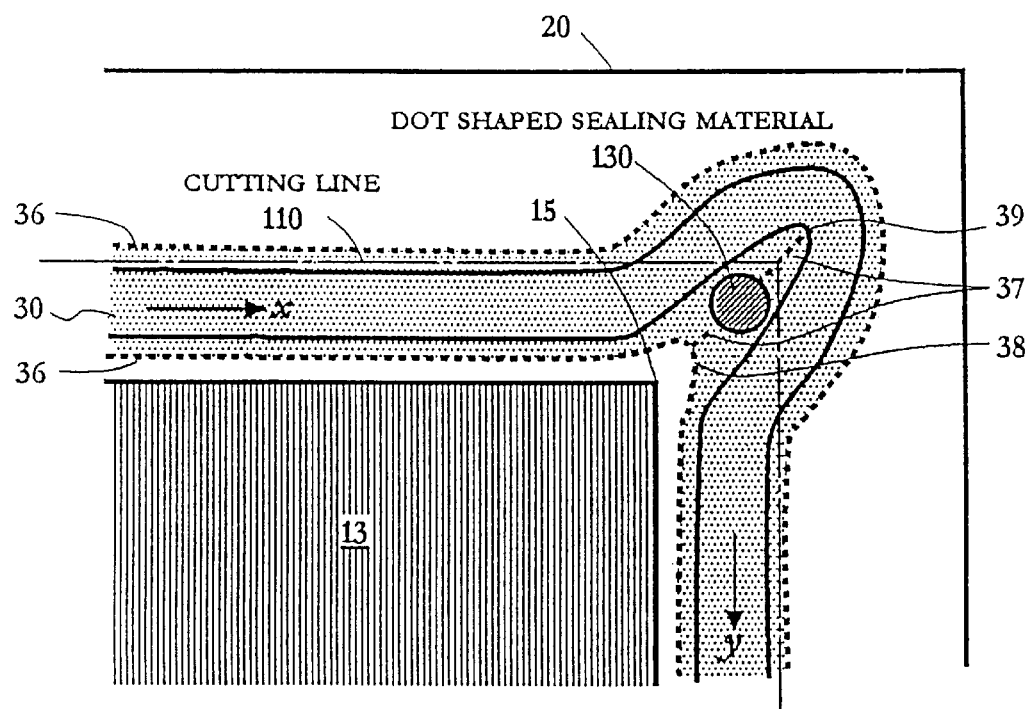

The embodiments shown in the FIGS. 6 and 7 can be used in combination with the embodiments including the protrude portions 100 or the recess portions 105.

The present invention can realize the method for applying the sealing material which prevents the sealing material on the corner regions from being overlapped with the corners of the display region of the liquid crystal cell. The present invention can realize the liquid crystal cell with the larger display region than that of the prior liquid crystal cell when the glass substrates of the same size as that of the prior liquid crystal cell are used.

We claim:

1. A method for fabricating a liquid crystal cell including two substrates sealed by a sealing material placed on side regions and corner regions surrounding a display region, the method comprising the steps of:

forming a differences of level at each boundary of said side region and said corner region on one surface of a first substrate for providing said corner region with a height which is lower than a height of said side region; wherein a protrude portion is formed on each of said side regions of said first substrate, and a groove portion is formed on each of said corner portions;

applying said sealing material on said side regions and said corner regions on said one surface of said first substrate; and positioning a second substrate on said sealing material on said one surface of said first substrate, and decreasing a distance between said first substrate and said second substrate to collapse said sealing material applied on said regions and said corner regions to seal said first and second substrates.

2. The method of claim 1, wherein said sealing material is epoxy resin.

3. The method of claim 1, wherein said first substrate includes a color filter layer, and said second substrate includes thin film transistors.

4. The method of claim 3, wherein said sealing material is epoxy resin.

5. The method of claim 1, wherein a protrude portion is formed on each of said side regions of said first substrate.

6. The method of claim 5, wherein said protrude portion is formed by steps of applying a colored layer on said first substrate, and forming a pattern of said colored layer extending to surround said display region.

7. The method of claim 1, wherein a groove portion is formed on each of said corner regions.

8. The method of claim 7, wherein said groove portion extends along an arc like trace.

9. The method of claim 7, wherein said groove portion is formed by steps of applying a colored layer on said first substrate and selectively etching said colored layer.

10. The method of claim 1, further comprising the step of forming a transparent ITO electrode on said protrude portions on said side regions and said groove portions in said corner regions.

11. A method for fabricating a liquid crystal cell including two substrates sealed by a sealing material placed on regions adjacent to edges of said substrates, the method comprising the steps of:

applying a sealing material on side regions and corner regions surrounding a display region on one surface of a first substrate;

positioning a second substrate on said sealing material on said one surface of said first substrate, and decreasing a distance between said first substrate and said second substrate to collapse said sealing material applied on said side regions and said corner regions to seal said first and second substrates, wherein said step of applying said sealing material applies U shaped sealing material in said corner region, which extends toward a corner of said substrate, whereby an inside edge of one leg portion of said U shaped sealing material and an inside edge of the other leg portion of said U shaped sealing material form the substantially right angled corner during said step for collapsing said sealing material.

12. The method of claim 11, wherein said sealing material is applied by a tool for dispensing said sealing material.

13. The method of claim 11, wherein said sealing material is applied by screen printing.

14. The method of claim 11, wherein a dot shaped sealing material is applied on said corner region before or after said application of said U shaped sealing material.

15. The method of claim 11, wherein a protrude portion of a rectangular shape is formed on said corner region, and said sealing material applied in said step of applying said sealing material is also applied on said protrude portion of said rectangular shape.

16. The method of claim 11, wherein a protrude portion is formed on each of said side regions on said first substrate.

* * * * *